United States Patent [19]

Isozaki et al.

[11] Patent Number: 4,772,672

[45] Date of Patent: Sep. 20, 1988

[54] CURABLE COMPOSITIONS AND METHOD OF CURING SAME

[75] Inventors: Osamu Isozaki, Yokohama; Noboru Nakai, Hiratsuka, both of Japan

[73] Assignee: Kansai Paint Company, Limited, Amagasaki, Japan

[21] Appl. No.: 47,392

[22] Filed: May 8, 1987

[30] Foreign Application Priority Data

May 15, 1986 [JP] Japan .................. 61-111336
Jun. 5, 1986 [JP] Japan .................. 61-130525

[51] Int. Cl.$^4$ .................. C08F 4/06; C08F 4/52; C08F 24/00
[52] U.S. Cl. .................. 526/273; 526/189; 526/268; 526/279
[58] Field of Search .............. 526/273, 172, 189, 268

[56] References Cited

U.S. PATENT DOCUMENTS

| | | | |
|---|---|---|---|
| 3,187,018 | 6/1965 | Tinsley et al. | 526/273 |
| 3,242,145 | 3/1966 | Martin | 526/172 |
| 3,277,036 | 10/1966 | Whitworth, Jr. et al. | 526/273 |
| 3,532,642 | 10/1970 | Furukawa et al. | 526/268 |
| 3,697,496 | 10/1972 | Ueno et al. | 526/268 |
| 4,245,079 | 1/1981 | Matsumoto et al. | 428/429 |
| 4,652,618 | 3/1987 | Sumida et al. | 528/19 |

FOREIGN PATENT DOCUMENTS

| | | | |
|---|---|---|---|
| 60-067553 | 4/1985 | Japan . | |
| 932817 | 7/1963 | United Kingdom | 526/273 |
| 1060469 | 3/1967 | United Kingdom | 526/273 |
| 2086914 | 5/1982 | United Kingdom | 526/273 |

*Primary Examiner*—Joseph L. Schofer
*Assistant Examiner*—N. Sarofim
*Attorney, Agent, or Firm*—Armstrong, Nikaido, Marmelstein & Kubovcik

[57] ABSTRACT

The present invention provides a curable composition characterized in that the composition comprises a copolymer comprising as monomer components an oxirane-containing vinyl monomer and a specific alkoxysilane-containing vinyl monomer, and as a crosslinking curing agent at least one of an aluminum chelate compound and a zirconium chelate compound having neither of hydroxyl and alkoxyl directly combined with zirconium. The invention also provides a curing method characterized in that the composition is cured at a temperature of up to 100° C. in the presence of water.

11 Claims, No Drawings

CURABLE COMPOSITIONS AND METHOD OF CURING SAME

The present invention relates to novel curable compositions and a method of curing the same.

Compositions are already known which are prepared by admixing an acid, base, organometallic catalyst or the like with an alkoxysilane-containing vinyl polymer and which can be cured by crosslinking at a relatively low temperature, i.e., at room temperature to 100° C. For example, Unexamined Japanese Patent Publication No. SHO 60-67553 discloses a composition which comprises a vinyl polymer containing an alkoxysilane, such as methacryloxypropyltrimethoxysilane, and an aluminum chelate compound admixed with the polymer.

However, the conventional composition has drawbacks. Since the silanol group produced by the hydrolysis of the alkoxysilane is the sole crosslinking functional group, the composition requires a large quantity of water for curing. Consequently, large amounts of by-products, such as alcohol, resulting from the hydrolysis give impaired properties to the cured product. Further when the composition is cured in the presence of only the water in air, the composition is cured only over the surface in contact with air, with its interior remaining almost uncured, so that the difference between the surface and the interior in the degree of curing is liable to result in a shrunk product on curing.

An object of the present invention is to provide a novel composition which can be fully cured with a small amount of water and a method of curing the composition.

Another object of the invention is to provide a novel composition for affording a cure product of excellent properties and a method of curing the composition.

Another object of the invention is to provide a novel composition which is curable only with the water in air with a reduced difference between the surface and the interior in the degree of curing without shrinkage and a method of curing the composition.

These and other objects of the invention will become apparen from the following description.

The present invention provides a curable composition characterized in that the composition comprises a copolymer comprising as monomer components an oxirane-containing vinyl monomer and an alkoxysilane-containing vinyl monomer represented by the formula

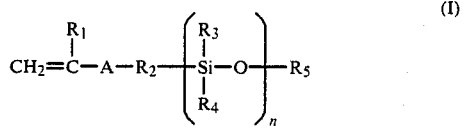

wherein A is

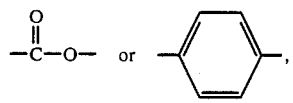 or 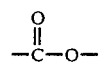, $R_1$ is a hydrogen atom or methyl, $R_2$ is a bivalent aliphatic saturated hydrocarbon group having 1 to 6 carbon atoms, $R_3$ and $R_4$ are the same or different and are each phenyl, alkyl having 1 to 6 carbon atoms or alkoxyl having 1 to 6 carbon atoms, $R_5$ is alkyl having 1 to 6 carbon atoms, and n is an integer of from 1 to 100; and as a crosslinking curing agent at least one of an aluminum chelate compound and a zirconium chelate compound having neither of hydroxyl and alkoxyl directly combined with zirconium. The invention also provides a curing method characterized in that the composition is cured at a temperature of up to 100° C. in the presence of water.

The present inventor has conducted intensive research to overcome the drawbacks of the conventional composition disclosed in the foregoing publication and discovered the following novel findings.

(1) Oxirane, when incorporated into the alkoxysilane-containing vinyl polymer, also serve as a crosslinking functional group along with the silanol, with the result that the above-mentioned composition can be fully cured in the presence of a small amount of water.

(2) The composition, when cured, produced only greatly reduced amounts of alcohol and like by-products, giving a cured product exhibiting excellent properties almost free of impairment.

(3) When the composition is cured in the presence of only the water in air, the silanol in the surface of the composition in contact with air undergoes a crosslinking reaction, which induces oxirane to undergo a crosslinking reaction throughout the interior in a chainlike fashion, consequently causing no shrinkage due to a reduced difference between the suface and the interior in the degree of curing.

The present invention has been accomplished based on these novel findings.

Examples of bivalent aliphatic saturated hydrocarbon groups represented by $R_2$ in the formula (I) and having 1 to 6 carbon atoms are straight-chain or branched-chain alkylene groups such as methylene, ethylene, propylene, tetramethylene, ethylethylene, pentamethylene, hexamethylene and the like. Examples of alkyl groups represented by $R_3$, $R_4$ and $R_5$ and having 1 to 6 carbon atoms are straight-chain or branched-chain alkyl groups such as methyl, ethyl, n-propyl, isopropyl, n-butyl, isobutyl, sec-butyl, tert-butyl, n-pentyl, isopentyl, neopentyl, n-hexyl, isohexyl and the like. Examples of alkoxyl groups represented by $R_3$ and $R_4$ and having 1 to 6 carbon atoms are straight-chain or branched-chain alkoxyl groups such as methoxy, ethoxy, n-propoxy, isopropoxy, n-butoxy, isobutoxy, sec-butoxy, tert-butoxy, n-pentoxy, isopentoxy, n-hexyloxy, isohexyloxy and the like. When n in the formula (I) is at least 2, the groups $R_3$ may be the same as or different from each other, and the groups $R_4$ may be the same as or different from each other.

Examples of compounds of the formula (I) wherein A is $$\begin{matrix} O \\ \| \\ -C-O- \end{matrix}$$

useful as one of the monomers to be used in the invention are γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphnyldiethoxysilane, γ-(meth)acryloxybutylphenyldipropoxysilane, γ-(meth)acryloxypropyldimethylmethoxysilane, γ-(meth)a- cryloxypropyldimethylethoxysilane, γ-(meth)acryloxy-propylphenylmethylmethoxysilane, γ-(meth)acryloxy-propylphenylmethylethoxysilane,
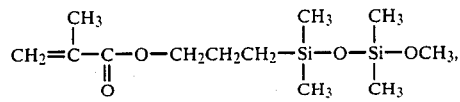
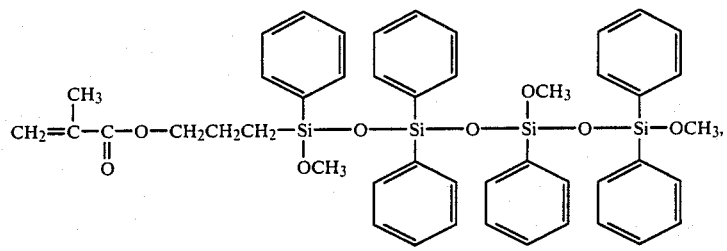
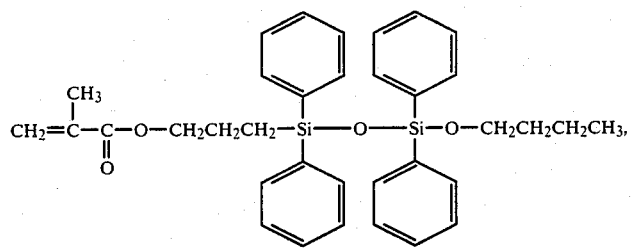
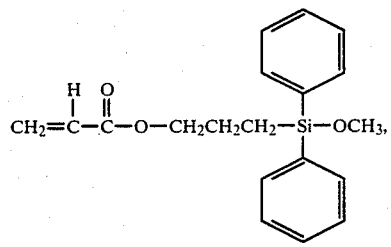
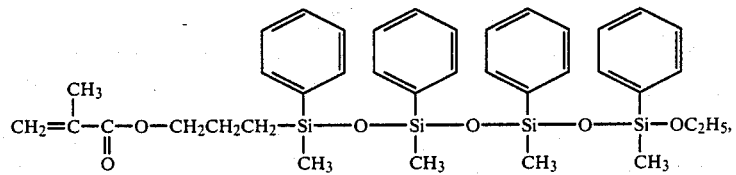
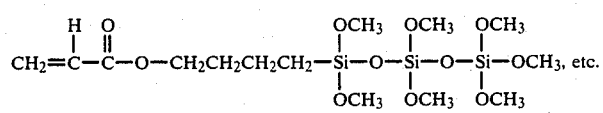
Examples of compounds of the formula (I) wherein A is
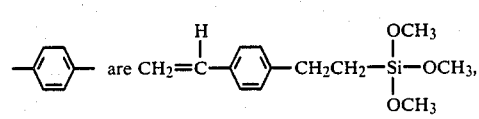
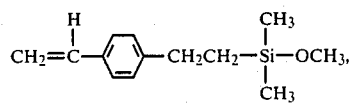
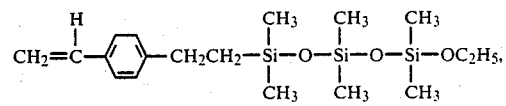
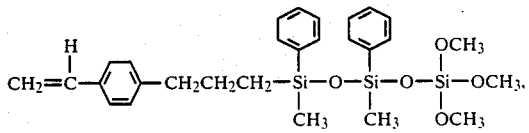
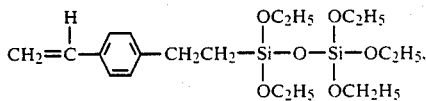

-continued

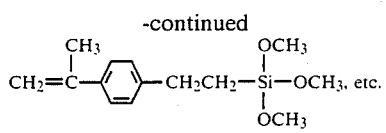

The oxirane-containing vinyl monomer can be any of various vinyl monomers having oxirane in the molecule.

It is especially preferable to use vinyl monomers containing alicyclic oxirane in view of curability, etc. Stated more specifically, the oxirane group is highly reactive when subjected to a ring-opening polymerization reaction, with the result that the use of vinyl monomers containing this group permits rapid curing and affords a cured coating of improved properties.

More preferable are acrylic or methacrylic acid esters containing alicyclic oxirane, such as those represented by the following formulae (II) to (XIII).

hexamethylene and the like. Examples of bivalent hydrocarbon groups having 1 to 10 carbon atoms and represented by $R_8$ are methylene, ethylene, propylene, tetramethylene, ethylethylene, pentamethylene, hexamethylene, polymethylene, phenylene,

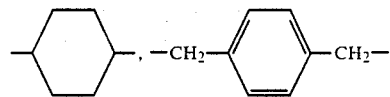

and the like.

Examples of typical vinyl monomers containing an oxirane group other than those of the alicyclic type include the compound of the following formula (XIV).

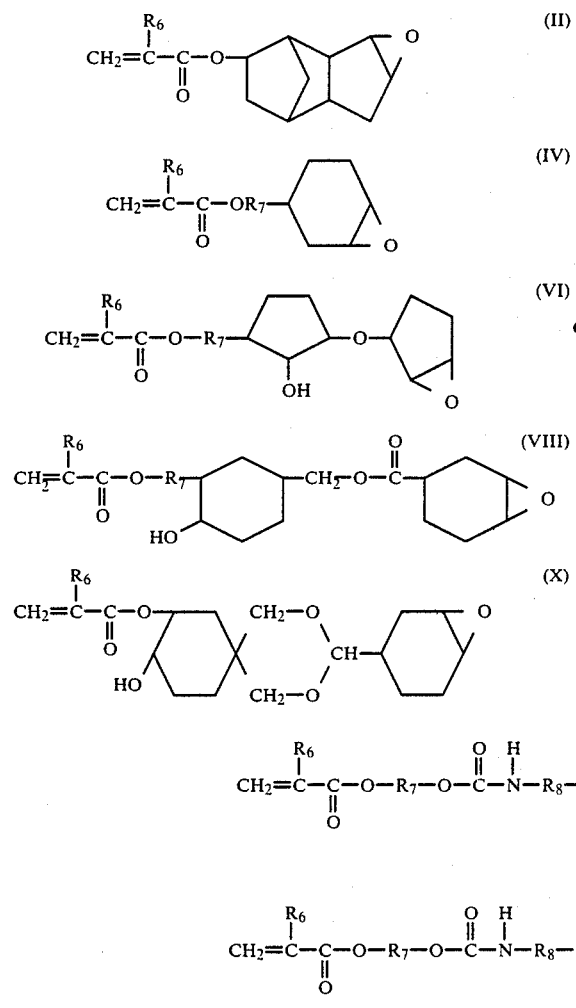

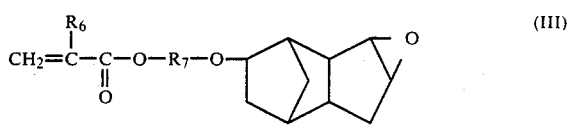

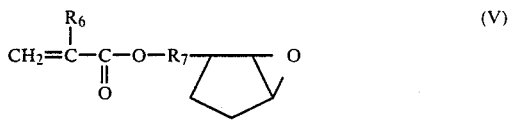

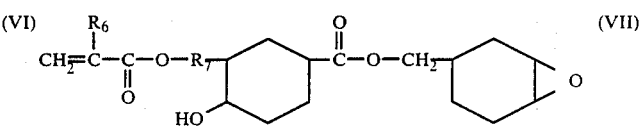

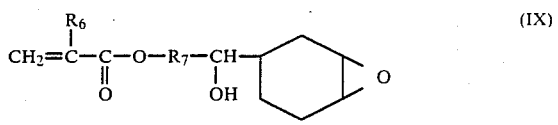

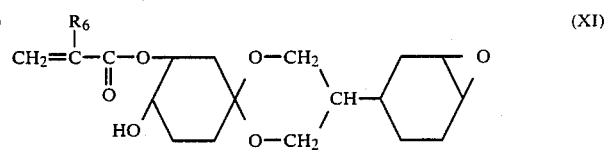

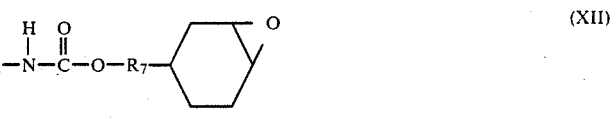

wherein $R_6$ is a hydrogen atom or methyl, $R_7$ is a bivalent aliphatic hydrocarbon group having 1 to 6 carbon atoms, and $R_8$ is a bivalent hydrocarbon group having 1 to 0 carbon atoms.

Examples of bivalent aliphatic hydrocarbon groups having 1 to 6 carbon atoms and represented by $R_7$ in the above formulae are straight-chain or branched-chain alkylene groups such as methylene, ethylene, propylene, tetramethylene, ethylethylene, pentamethylene,

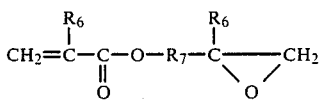

wherein $R_6$ and $R_7$ are as defined above.

The copolymer to be used as the resin component of the present composition comprises the compound of the formula (I), i.e. alkoxysilane-containing vinyl monomer (hereinafter referred to as the "monomer A"), and the oxirane-containing vinyl monomer (hereinafter referred to as the "monomer B") as monomer components. Thus, the copolymer consists essentially of the monomer A and the monomer B. The monomer A and the monomer B are used usually in the A:B ratio by weight of about 1:0.02–10000. If the proportion of B is greater than this range, lower curability tends to result, whereas if the proportion of B is smaller than this range, the composition tends to shrink during curing, giving a cured product of impaired properties, hence undesirable. Preferably, the A:B ratio by weight is about 1:0.1–1000. More preferably, the A:B ratio by weight is about 1:0.25–100.

When required, $\alpha,\beta$-ethylenically unsaturated monomers other than the monomers A and B are usable in combination with these essential monomers for preparing the copolymer. To assure the contemplated advantage of the present invention in this case, it is desirable that such $\alpha,\beta$-ethylenically unsaturated monomers be used usually in an amount of up to about 99 wt. %, preferably up to about 97 wt. %, based on the combined amount of all the monomers.

The copolymer can be prepared by a usual process under usual conditions and is preferably about 3000 to about 100000 in number average molecular weight.

The $\alpha,\beta$-ethylenically unsaturated monomer to be used as an optional monomer component for the copolymer can be selected from among a wide variety of such monomers in accordance with the desired properties of the composition to be obtained. Typical examples of such unsaturated monomers are as follows.

(a) Acrylic or methacrylic acid esters including $C_1$–$C_{18}$ alkyl esters of acrylic or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$–$C_{18}$ alkoxyalkyl esters of acrylic or methacryl acid such as methoxybutyl acrylate, methoxybutyl methacrylate, methoxyethyl acrylate, methoxyethyl methacrylate, ethoxybutyl acrylate and ethoxybutyl methacrylate; $C_2$–$C_8$ alkenyl esters of acrylic or methacrylic acid such as allyl acrylate and allyl methacrylate; $C_2$–$C_8$ hydroxyalkyl esters of acrylic or methacrylic acid such as hydroxyethyl acrylate, hydroxyethyl methacrylate, hydroxypropyl acrylate and hydroxypropyl methacrylate; and $C_3$ to $C_{18}$ alkenyloxyalkyl esters of acrylic or methacrylic acid such as allyloxyethyl acrylate and allyloxyethyl methacrylate.

(b) Vinyl aromatic compounds such as styrene, $\alpha$-methylstyrene, vinyltoluene and p-chlorostyrene.

(c) Polyolefin compounds such as butadiene, isoprene and chloroprene.

(d) Others including acrylonitrile, methacrylonitrile, methyl isopropenyl ketone, vinyl acetate, "Veova 10" (Shell Corp., trademark), vinyl proprionate, vinyl pivalate, etc.

The curable composition of the invention comprises the copolymer of monomer A and monomer B, and an aluminum chelate compound and/or a specified zirconium chelate compound serving as crosslinking curing agent(s) and admixed with the copolymer.

Aluminum chelate compounds useful as crosslinking curing agents for the invention are those already known, among which suitable are those obtained by treating organoaluminums with a chelating agent. Examples of useful organoaluminums are those represented by the formula

wherein at least one of $R_9$, $R_{10}$ and $R_{11}$ is alkoxyl having 1 to 13 carbon atoms (such as methoxy, ethoxy, n-propoxy, isopropoxy, n-butoxy, isobutoxy, sec-butoxy, tert-butoxy, n-pentoxy, isoamyloxy, n-hexyloxy, n-heptyloxy or n-octyloxy) or alkoxyalkoxyl having 3 to 10 carbon atoms (such as methoxymethoxy, methoxyethoxy, ethoxybutoxy or butoxypentoxy), the remainder being alkyl having 1 to 6 carbon atoms (such as methyl, ethyl, n-propyl, isopropyl, n-butyl, isobutyl, sec-butyl, tert-butyl or amyl), aryl (such as phenyl or toluyl), alkenyl (such as vinyl or allyl) or mercapto- or amino-substituted alkyl having 1 to 6 carbon atoms (such as $\gamma$-mercaptopropyl, aminoethyl, aminopropyl or aminobutyl). More specific examples of such compounds are aluminum isopropylate, aluminum sec-butylate and aluminum tert-butylate.

Examples of useful chelating agents which are to be reacted with such organoaluminums are lower alkanolamines (such as triethanolamine, diethanolamine and dimethylaminoethanol), acetoacetic acid esters (such as methyl acetoacetate and ethyl acetoacetate), diketone alcohols (such as diacetone alcohol), diketones (such as acetylacetone), glycols (such as ethylene glycol and octylene glycol), hydroxycarboxylic acids (such as lactic acid and tartaric acid), dicarboxylic acids or esters thereof (such as maleic acid or ethyl maleate), salicylic acid, catechol, pyrogallol and the like. Among these compounds, lower alkanolamines, hydroxycarboxylic acids and diketones are desirable.

Examples of aluminum chelate compounds which are advantageously usable in the invention are ethyl acetoacetate aluminum diisopropylate, aluminum tris(ethyl acetoacetate), tristrifluoroacetylacetonatoaluminum, trishexafluoroacetylacetonatoaluminum, trisethylacetoacetatoaluminum, tris(n-propylacetoacetato)aluminum, tris(isopropylacetoacetato)aluminum, tris(n-butylacetoacetato)aluminum, trissalicylaldehydatoaluminum, isopropoxybisethylacetoacetatoaluminum, 2,2,6,6-tetramethyl-3,5-heptadionatoaluminum, tris(2-ethoxy-carbonylphenolate)aluminum, diisopropoxyethylacetoacetatoaluminum, tris(acetylacetonato)aluminum, tris(ethylacetonato)aluminum, tris(salicylaldehydato)aluminum, ethylacetonatoaluminum diisopropylate, monoacetylacetonato bis(ethylacetonato)aluminum, tris(iso-propylate)aluminum, tris(sec-butylate)aluminum, mono-sec-butoxyaluminum diisopropylate and the like. These compounds may be partially condensed ones.

According to the present invention, another crosslinking curing agent is usable which is a zirconium chelate compound having neither of hydroxyl and alkoxyl which are directly bonded to zirconium, i.e. to the zirconium atom in the molecule. The use of this zirconium chelate compound results in a greatly prolonged pot life, renders the composition applicable with a greatly improved efficiency and gives enhanced chemical resistance to the cured product obtained. On the other hand, presence of a zirconium chelate compound having hydroxyl or alkoxyl directly bonded to zirconium permits the curing reaction of the copolymer at too high a velocity, leads to a shortened pot life and a reduced working efficiency and is therefore undesirable. As another undesirable result, the coating of the composition then tends to become less smooth-surfaced.

Such zirconium chelate compounds useful for the invention are those already known, among which suitable are those obtained by treating organozirconiums with a chelating agent. Examples of useful organozirconiums are those represented by the formula

(XVI)

wherein at least two of $R_{12}$, $R_{13}$, $R_{14}$ and $R_{15}$ are each an alkoxyl having 1 to 13 carbon atoms (such as methoxy, ethoxy, n-propoxy, isopropoxy, n-butoxy, isobutoxy, sec-butoxy, tert-butoxy, n-pentoxy, isoamyloxy, n-hexyloxy, n-heptyloxy or n-octyloxy) or alkoxyalkoxyl having 3 to 10 carbon atoms (such as methoxymethoxy, methoxyethoxy, ethoxybutoxy or butoxypentoxy), the remainder being alkyl having 1 to 6 carbon atoms (such as methyl, ethyl, n-propyl, isopropyl, n-butyl, isobutyl, sec-butyl, tert-butyl or amyl), aryl (such as phenyl or toluyl), alkenyl (such as vinyl or allyl) or mercapto- or amino-substituted alkyl having 1 to 6 carbon atoms (such as γ-mercaptopropyl, aminoethyl, aminopropyl or aminobutyl). More specific examples of such compounds are tetramethylzirconate, tetraethylzirconate, tetraisopropylzirconate, tetra-n-butylzirconate, tetraisobutylzirconate, tetratert-butylzirconate and the like.

The chelating agent to be reacted with such organozirconiums can be any of those mentioned above for preparing aluminum chelate compounds.

Examples of zirconium chelate compounds advantageously usable for the present invention are tetrakis(oxalic acid)zirconium, tetrakis(acetylacetone)zirconium, tetrakis(n-propylacetoacetato)zirconium, tetrakis(ethylacetoacetato)zirconium, tetrakis(salicylaldehydato)zirconium and the like. These compounds may be partially condensed ones.

According to the present invention, one of aluminum chelate compounds and zirconium chelate compounds, such as those exemplified above, is used as a crosslinking curing agent, or at least two of them are usable in combination. It is suitable that the crosslinking curing agent be used in an amount of about 0.01 to about 30 parts by weight per 100 parts by weight of the copolymer. If the amount is smaller, lower curability tends to result, whereas amounts larger than the above range are not desirable since the agent will then remain in the cured product to result in reduced resistance to water. The amount is preferably 0.1 to 10 parts by weight, more preferably 1 to 5 parts by weight.

When required, extender pigments, coloring pigments, dyes, etc. can be incorporated into the curable composition of the invention. Other compounds which can be also incorporated into the present composition include monofunctional or polyfunctional epoxy compounds, low-molecular-weight silane compounds, such as triphenylmethoxysilane and diphenyldimethoxysilane, silicone resins having a usual alkoxysilane group and other resins.

The curable composition of the invention is advantageously usable, for example, as a coating composition, adhesive composition, ink or the like.

The present composition can be easily cured by crosslinking at a low temperature of up to 100° C. in the presence of water. Stated more specifically, the composition of the invention can be fully cured usually in about 8 hours to about 7 days without heating when it is applied with water admixed therewith, or when the composition is merely exposed to air after application. Further when heated at 40° to 100° C., the composition can be completely cured in about 5 minutes to about 3 hours. The amount of water required for curing is in such a small amount that the moisture in air satisfactorily cures the composition. The amount of water when used conjointly with the composition before application is usually about 0.1 to about 1 wt. % based on the composition, whereby the composition can be fully cured.

The reason why the present composition cures readily at a low temperature in the presence of a small amount of water will presumably be as follows. In the first stage, the alkoxyl groups derived from the monomer A hydrolyze in the presence of water and also in the presence of the aluminum chelate compound and/or the zirconium chelate compound serving as catalyst(s) to produce silanol groups. In the second stage, some silanol groups undergo dehydration condensation for crosslinking or react with the aluminum chelate compound or with the zirconium chelate compound to form

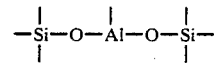

bonds or

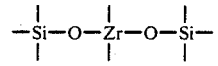

bonds for crosslinking. In the third stage,

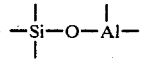

bonds or

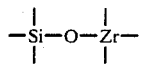

bonds coordinate other silanol groups to polarize the silanol groups, which cause the oxirane groups from the monomer B to undergo ring-opening polymerization to effect crosslinking.

The conventional composition of the type described is cured only through the second-stage crosslinking reaction, whereas with the composition of the invention incorporating the monomer B, the second-stage reaction and the third-stage reaction concurrently proceed in a chainlike fashion to cure the composition through crosslinking. It is therefore thought that the present composition can be cured favorably at a low temperature in the presence of a small quantity of water.

According to the present invention, the copolymer serving as the resin component of the curable composition comprises the monomer A and monomer B as its essential monomer components. This results in the following remarkable advantages.

(1) The composition can be cured by crosslinking at a low temperature of up to 100° C. in the presence of a very small amount of water, such as the moisture in air.

(2) Crosslinking through the above-mentioned condensation reaction occurs concurrently with the ring-opening polymerization reaction, consequently reducing the difference between the surface of the applied composition and the interior thereof in the degree of curing to obviate shrinkage.

(3) Since the composition can be cured with reduced amounts of alcohol and like by-products, the cured product is excellent in properties, especially in resistance to water, weather, impact and contamination, overcoatability, flexibility, etc.

(4) The composition has high storage stability and remains stable for at least one year in the absence of water.

(5) The presence of the specified zirconium chelate compound as a crosslinking curing agent gives the composition a greatly extended pot life and enhanced chemical resistance and renders the composition applicable with improved efficiency.

The present invention will be described in greater detail with reference to the following examples and comparative examples.

EXAMPLE 1

A vinyl copolymer was prepared with the following monomer composition.

| | |
|---|---:|
| CH$_2$=C(H)-C(=O)-O-CH$_2$-(cyclohexene oxide) | 50.2 wt. % |
| n-Butyl methacrylate | 30.5 wt. % |

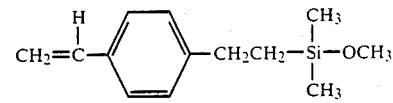   19.3 wt. %

The viscosity of a 50 wt. % toluene solution of the copolymer was H when measured by a Gardner viscometer. The GPC molecular weight of the copolymer exhibited a peak value at 15000. Two grams of tris(n-propylacetoacetato)aluminum was admixed with 100 g of the 50 wt. % toluene solution to obtain a curable composition of the invention.

EXAMPLE 2

A vinyl copolymer was prepared with the following monomer composition.

| | |
|---|---:|
| CH$_2$=C(CH$_3$)-C(=O)-O-CH$_2$-CH(OH)-(cyclohexene oxide) | 90 wt. % |
| CH$_2$=C(CH$_3$)-C(=O)-O-CH$_2$CH$_2$CH$_2$-Si(Ph)$_2$-O-Si(Ph)$_2$-O-(CH$_2$)$_3$CH$_3$ | 10 wt. % |

The viscosity of a 70 wt. % isobutyl acetate solution of the copolymer was Z when measured by a Gardner viscometer. The GPC molecular weight of the copolymer exhibited a peak value at 5000. Twenty grams of tris(salicylaldehydato)aluminum was admixed with 100 g of the 70 wt. % isobutyl acetate solution to obtain a curable composition of the invention.

EXAMPLE 3

A vinyl copolymer was prepared with the following monomer composition.

| | |
|---|---:|
| CH$_2$=C(H)-C(=O)-O-CH$_2$CH$_2$O-(dicyclopentadiene epoxide) | 40 wt. % |
| γ-Acryloxypropylphenylmethylmethoxysilane | 5 wt. % |
| Styrene | 55 wt. % |

The Gardner viscosity of a 50 wt. % toluene solution of the copolymer was W. The GPC peak molecular weight of the copolymer was 25000. One gram of tris(ethylacetoacetato)aluminum was admixed with 100 g of the 50 wt. % toluene solution to obtain a composition of the invention.

EXAMPLE 4

A vinyl copolymer was prepared with the following monomer composition.

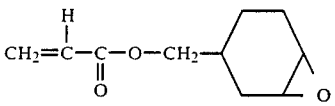

| | |
|---|---|
| γ-Methyacryloxypropyltrimethoxysilane | 50 wt. % |
| Methyl acrylate | 35 wt. % |

The Gardner viscosity of a 50 wt. % toluene solution of the copolymer was X. The GPC peak molecular weight thereof was 40000. Ten gram of tris-(acetylacetonato)aluminum was admixed with 100 g of the 50 wt. % toluene solution to obtain a composition of the invention.

EXAMPLE 5

A vinyl copolymer was prepared with the following monomer composition.

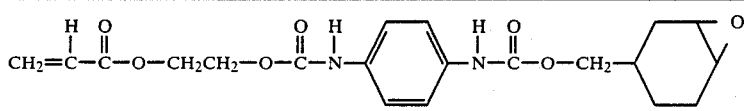

| | |
|---|---|
| Methyl methacrylate | 94 wt. % |

The Gardner viscosity of a 50 wt. % toluenebutanol (1:1) solution of the copolymer was S, and the GPC peak molecular weight thereof was 28000. Fifty gram of rutil-type titanium dioxide was admixed with 100 g of the 50 wt. % toluene-butanol solution and thoroughly dispersed therein. One gram of tris-(acetylacetonato)aluminum was admixed with the dispersion to obtain a composition of the invention.

EXAMPLE 6

A vinyl copolymer was prepared with the following monomer composition.

| | |
|---|---|
| Oxydicyclopentenyl acrylate | 20.5 wt. % |
| Styrene | 40.5 wt. % |
| n-Butyl acrylate | 29.0 wt. % |
| γ-methacryloxypropylmethyldimethoxysilane | 10.0 wt. % |

The viscosity of a 50 wt. % toluene solution of the copolymer was X when measured by a Gardner viscometer. The GPC molecular weight of the copolymer exhibited a peak value at 35000. Ten grams of tris(ethylacetonato)aluminum was admixed with 100 g of the 50 wt. % toluene solution to obtain a composition of the invention.

EXAMPLE 7

A vinyl copolymer was prepared with the following monomer composition.

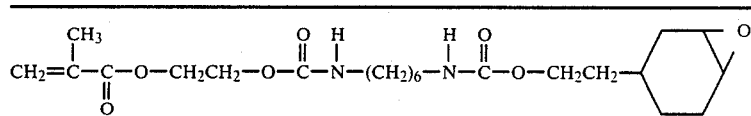

| | |
|---|---|
| Methyl methacrylate | 40 wt. % |
| γ-Methacryloxypropyldimethylmethoxysilane | 10 wt. % |

The viscosity of a 50 wt. % toluene solution of the copolymer was $Z_2$ when measured by a Gardner viscometer. The GPC molecular weight of the copolymer exhibited a peak value at 8800. A 0.5 g quantity of tris(-salicylaldehydato)aluminum was admixed with 100 g of the 50 wt. % toluene solution to obtain a composition of the invention.

EXAMPLE 8

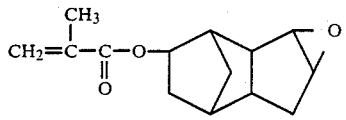

A vinyl copolymer was prepared with the following monomer composition.

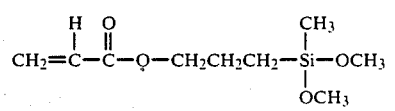

| | |
|---|---|
| Methyl methacrylate | 20 wt. % |
| Ethyl acrylate | 20 wt. % |

The viscosity of a 50 wt. % toluene solution of the copolymer was TU when measured by a Gardner viscometer. The GPC molecular weight of the copolymer exhibited a peak value at 12000. One gram of tris(ethylacetoacetato)aluminum was admixed with 100 g of the 50 wt. % toluene solution to obtain a composition of the invention.

EXAMPLE 9

A vinyl copolymer was prepared with the following monomer composition.

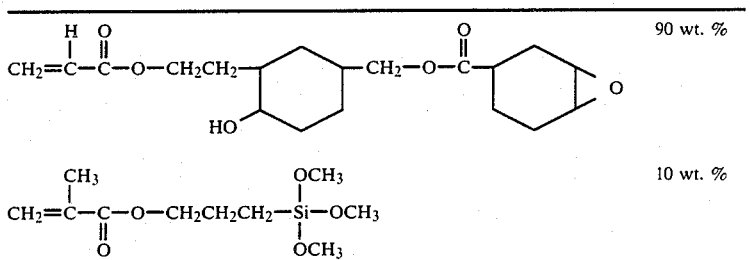

The viscosity of a 50 wt. % toluene solution of the copolymer was $Z_2$ when measured by a Gardner viscometer. The GPC molecular weight of the copolymer exhibited a peak value at 20000. Ten grams of tris(acetylacetonato)aluminum was admixed with 100 g of the 50 wt. % toluene solution, giving a composition of the invention.

EXAMPLE 10

A vinyl copolymer was prepared with the following monomer composition.

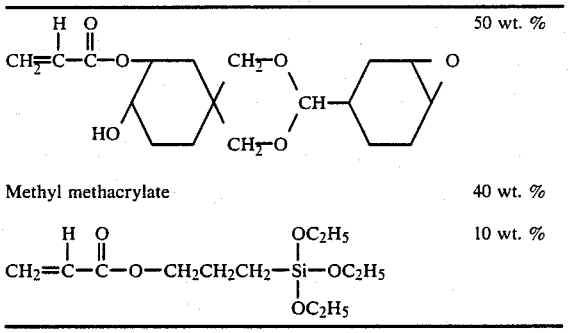

The viscosity of a 50 wt. % toluene solution of the copolymer was W when measured by a Gardner viscometer. The GPC molecular weight of the copolymer exhibited a peak value at 10000. One gram of tris(acetylacetonato)aluminum was admixed with 100 g of the 50 wt. % toluene solution, giving a composition of the invention.

EXAMPLE 11

A curable composition of the invention was prepared in the same manner as in Example 1 except that in place of tris(n-propylacetoacetato)aluminum, tetrakis(n-propylacetoacetato)zirconium was used in the same amount as the aluminum compound.

EXAMPLE 12

A curable composition of the invention was prepared in the same manner as in Example 2 except that in place of tris(salicylaldehydato)aluminum, tetrakis(salicylaldehydato)zirconium was used in the same amount as the aluminum compound.

EXAMPLE 13

A curable composition of the invention was prepared in the same manner as in Example 3 except that in place of tris(ethylacetoacetato)aluminum, tetrakis(ethylacetoacetato)zirconium was used in the same amount as the aluminum compound.

EXAMPLE 14

A curable composition of the invention was prepared in the same manner as in Example 4 except that in place of tris(acetylacetonato)aluminum, tetrakis(acetylacetone)zirconium was used in the same amount as the aluminum compound.

EXAMPLE 15

A curable composition of the invention was prepared in the same manner as in Example 5 except that in place of tris(acetylacetonato)aluminum, tetrakis(acetylacetone)zirconium was used in the same amount as the aluminum compound.

EXAMPLE 16

A curable composition of the invention was prepared in the same manner as in Example 6 except that in place of tris(etylacetonato)aluminum, tetrakis(ethylacetato)zirconium was used in the same amount as the aluminum compound.

EXAMPLE 17

A curable composition of the invention was prepared in the same manner as in Example 7 except that in place of tris(salicylaldehydato)aluminum, tetrakis(salicylaldehydato)zirconium was used in the same amount as the aluminum compound.

EXAMPLE 18

A vinyl copolymer was prepared with the following monomer composition.

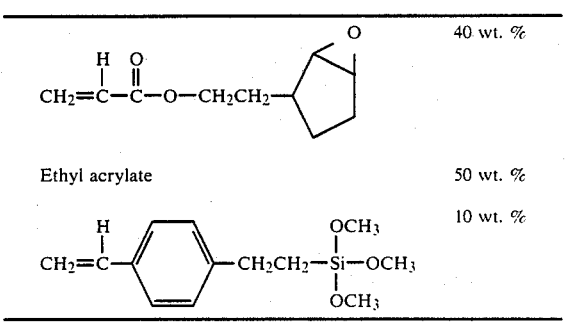

The viscosity of a 50 wt. % toluene solution of the copolymer was V when measured by a Gardner viscometer. The GPC molecular weight exhibited a peak value at 15000. Three grams of tetrakis-(acetylacetonato)zirconium was admixed with 100 g of the 50 wt. % toluene solution, giving a composition of the invention.

COMPARATIVE EXAMPLE 1

A vinyl copolymer was prepared with the following monomer composition.

| n-Butyl methacrylate | 95.0 wt. % |
|---|---|
| γ-Methacryloxypropyltrimethoxysilane | 5.0 wt. % |

The viscosity of a 50 wt. % toluene solution of the copolymer was N when measured by a Gardner viscometer. The GPC molecular weight exhibited a peak value at 28000. Three grams of tris-(acetylacetone)aluminum was admixed with 100 g of the 50 wt. % toluene solution to obtain a curable composition for comparison.

COMPARATIVE EXAMPLE 2

A comparative curable composition was prepared in the same manner as in Comparative Example 1 except that in place of tris(acetylacetone)aluminum, tetrakis-(acetylacetone)zirconium was used in the same amount as the aluminum compound.

COMPARATIVE EXAMPLE 3

A comparative curable composition was prepared in the same manner as in Example 8 except that in place of tetrakis(n-propylacetoacetato)zirconium, monohydroxytris(acetylacetone)zirconium was used in the same amount as the former zirconium compound.

COMPARATIVE EXAMPLE 4

A comparative composition wa prepared in the same manner as in Example 1 except that the compound of the following formula was not used.

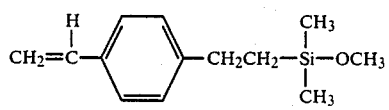

The following tests were conducted.

Coating Property Tests

Each of the compositions of Examples 1-18 and Comparative Examples 1-4 was applied to a substrate and dried under the condition listed in Table 1 to form a coating 100 μm in thickness, which was tested. For the determination of resistance to water or weather, a 50-μm-thick coating was prepared.

Gel fraction ratio:
The substrate was glass panel. The dry coating was removed from the glass panel and subjected to extraction in acetone at reflux temperature using Soxhlet's extractor for 6 hours. The residue of the coating was expressed in percentage.

Impact resistance:
The substrate was a soft steel sheet. Using a Du Pont impact tester, a 500-gram weight was dropped onto the coated surface of the panel to determine the maximum distance (cm) of fall which cause no cracking or peeling of the coating.

Water resistance:
The substrate was a soft steel sheet. After immersing the test piece in worm water (40° C) for 60 days, the coating surface was checked for changes or abnormalities.

Weather resistance:
The substrate was an aluminum panel. Using a QUV weather-O-meter (with a UV fluorescent lamp, No.QFS-40, UV-B, 320 to 280 nm in wavelength range), product of The Q. Panel Company, the coating was subjected to repeated cycles, each involving irradiation with the lamp at a temperature of 40° to 70° C. for 15 minutes and exposure to condensed water droplets for 15 minutes, for 2000 hours and was thereafter checked for the degree of deterioration.

Overcoatability:
The coating was further coated with "Vinydelux" (coating emulsion of acrylic resin type, product of Kansai Paint Co., Ltd.) to a thickness of 40 μm and dried at 20° C. for 2 hours. The top coating was then cut crosswise and then tested for peel resistance using a tackiness cellophane tape.

Chemical resistance:
The substrate was a glass panel. The test piece was immersed in 10% NaOH aqueous solution (20° C.) for 7 days and thereafter checked for the appearance of the coating.

Pot life:
The composition was placed into an open container and allowed to stand at a temperature of 20° C and humidity of 70% to measure the period of time (hours) before the composition became viscous.

Table 1 shows the test results.

TABLE 1

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| | | | | | | | | Dry condition | | | | | | |
| Item | Temp. (°C.) | 80 | 25 | 100 | 25 | 100 | 25 | 40 | 25 | 25 | 80 | 40 | 40 | 60 |
| | Time | 30 min | 1 day | 5 min | 2 days | 30 min | 7 days | 60 min | 2 days | 2 days | 60 min | 60 min | 30 min | 60 min |
| State of coating surface | | Good | Good | Good | Good | Good | Good | Good | Good | Good | Good | Good | Good | Good |
| Gel fraction ratio | | 99.8 | 99.9 | 98.8 | 90.8 | 88.4 | 95.7 | 96.5 | 93.5 | 94.0 | 98.5 | 99.2 | 99.7 | 98.4 |
| Impact resistance | | 50< | 50< | 50< | 50< | 50< | 50< | 50< | 50< | 50< | 50< | 50< | 50< | 50< |
| Water resistance | | Good | Good | Good | Good | Good | Good | Good | Good | Good | Good | Good | Good | Good |
| Weather resistance | | Good | Good | Good | Good | Good | Good | Good | Good | Good | Good | Good | Good | Good |
| Overcoatability | | Good | Good | Good | Good | Good | Good | Good | Good | Good | Good | Good | Good | Good |
| Chemical resistance | | Good | Good | Good | Good | Good | Good | Good | Good | Good | Good | Good | Good | Good |
| Pot life | | 100< | 100< | 100< | 100< | 100< | 100< | 100< | 100< | 100< | 100< | 150< | 150< | 150< |

TABLE 1-continued

| | | Example | | | | | Comparative Example | | | |
|---|---|---|---|---|---|---|---|---|---|---|
| | | 14 | 15 | 16 | 17 | 18 | 1 | 2 | 3 | 4 |
| | | | | | | Dry condition | | | | |
| Item | Temp. (°C.)<br>Time | 40<br>60 min | 80<br>60 min | 100<br>5 min | 25<br>2 days | 80<br>60 min | 40<br>60 min | 40<br>60 min | 40<br>60 min | 80<br>30 min |
| State of coating surface | | Good | Good | Good | Good | Good | Shrank | Shrank | Good | |
| Gel fraction ratio | | 96.1 | 95.0 | 97.3 | 95.8 | 98.0 | 36.1 | 85.0 | 99.0 | |
| Impact resistance | | 50< | 50< | 50< | 50< | 50< | 10> | 20 | 50< | |
| Water resistance | | Good | Good | Good | Good | Good | Blushed and blistered | Blushed | Good | Remained uncured |
| Weather resistance | | Good | Good | Good | Good | Good | Hazed | Good | Good | |
| Overcoatability | | Good | Good | Good | Good | Good | — | — | Good | |
| Chemical resistance | | Good | Good | Good | Good | Good | Blushed | Blushed | Good | |
| Pot life | | 150< | 150< | 150< | 150< | 150< | 15 | 3 | 1 | |

We claim:

1. A curable composition characterized in that the composition comprises a copolymer comprising as monomer components an oxirane-containing vinyl monomer and an alkoxysilane-containing vinyl monomer represented by the formula

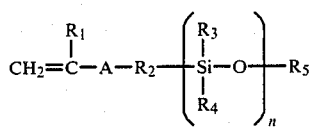

(I)

wherein A is

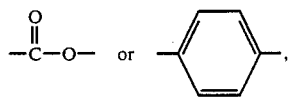

$R_1$ is hydrogen atom or methyl, $R_2$ is a bivalent aliphatic saturated hydrocarbon group having 1 to 6 carbon atoms, $R_3$ and $R_4$ are the same or different and are each phenyl, alkyl having 1 to 6 carbon atoms or alkoxyl having 1 to 6 carbon atoms, $R_5$ is alkyl having 1 to 6 carbon atoms, and n is an integer of from 1 to 100; and as a crosslinking curing agent at least one of an aluminum chelate compound and a zirconium chelate compound having neither of hydroxyl and alkoxyl directly combined with zirconium.

2. A composition as defined in claim 1 wherein the oxirane-containing vinyl monomer is an alicyclic oxirane-containing vinyl monomer.

3. A composition as defined in claim 2 wherein the alicyclic oxirane-containing vinyl monomer is an acrylic or methacrylic acid ester.

4. A composition as defined in claim 3 wherein the acrylic or methacrylic acid ester containing alicyclic oxirane is one of the compounds represented by the following formulae (II) to (XIII).

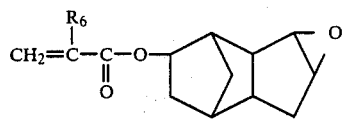 (II)

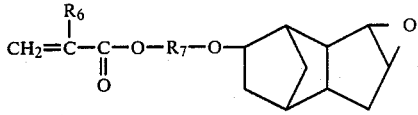 (III)

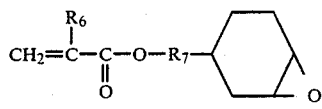 (IV)

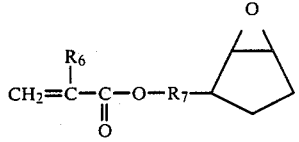 (V)

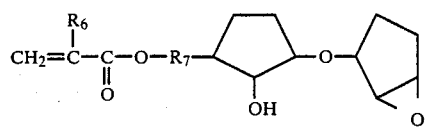 (VI)

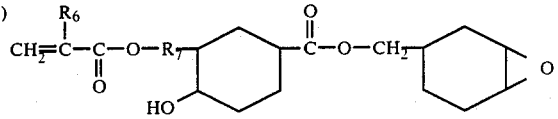 (VII)

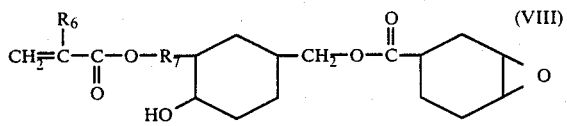 (VIII)

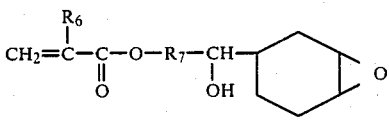 (IX)

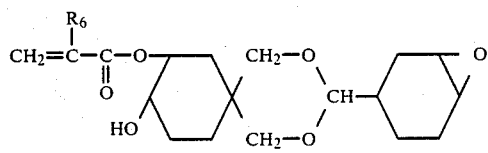 (X)

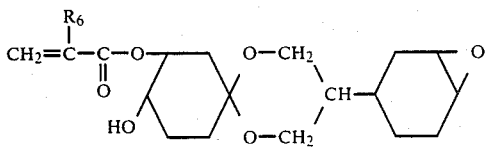 (XI)

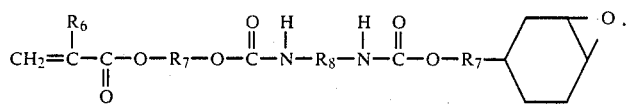
(XII)

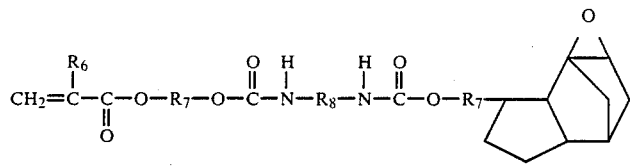
(XIII)

wherein $R_6$ is a hydrogen atom or methyl, $R_7$ is a bivalent aliphatic hydrocarbon group having 1 to 6 carbon atoms, and $R_8$ is a bivalent hydrocarbon group having 1 to 10 carbon atoms.

5. A composition as defined in claim 1 wherein the alkoxysilane-containing vinyl monomer (monomer A) represented by the formula (I) and the oxirane-containing vinyl monomer (monomer B) are present in the A:B weight ratio of about 1:0.02–10000.

6. A composition as defined in claim 5 wherein the A:B weight ratio is about 1:0.1–1000.

7. A composition as defined in claim 6 wherein the A:B weight ratio is about 1:0.25–100.

8. A composition as defined in claim 1 which comprises about 0.01 to about 30 parts by weight of the crosslinking curing agent per 100 parts by weight of the copolymer.

9. A curing method characterized in that the curable composition as defined in claim 1 is crosslinked at a temperature of up to 100° C. in the presence of water.

10. A product cured by the curing method as defined in claim 9.

11. A composition as defined in claim 1 wherein n is an integer of 1 to 10.

* * * * *